Feb. 16, 1960 M. A. CHAVANNES 2,924,863
SHEET MATERIAL PERFORATION
Filed Jan. 4, 1955 4 Sheets-Sheet 1
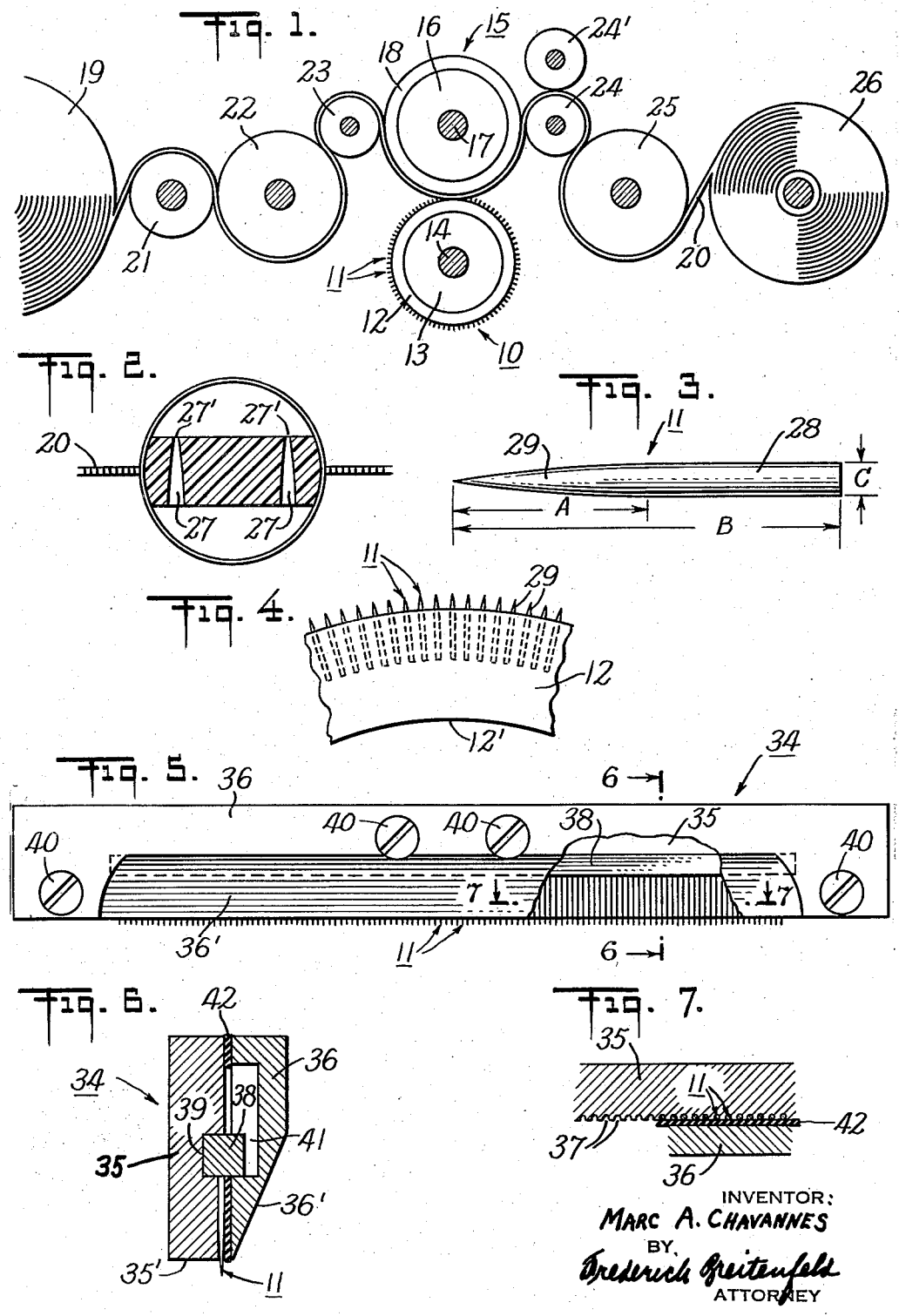
INVENTOR:
MARC A. CHAVANNES
BY
Frederick Breitenfeld
ATTORNEY Feb. 16, 1960 M. A. CHAVANNES 2,924,863
SHEET MATERIAL PERFORATION
Filed Jan. 4, 1955 4 Sheets-Sheet 2
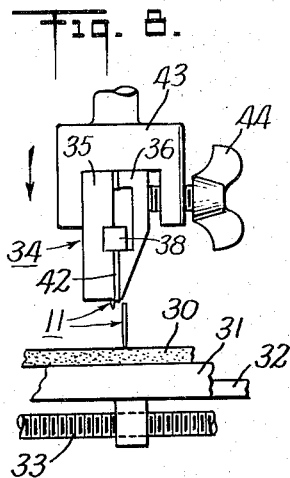
INVENTOR:
MARC A. CHAVANNES
BY
Frederick Breitenfeld
ATTORNEY

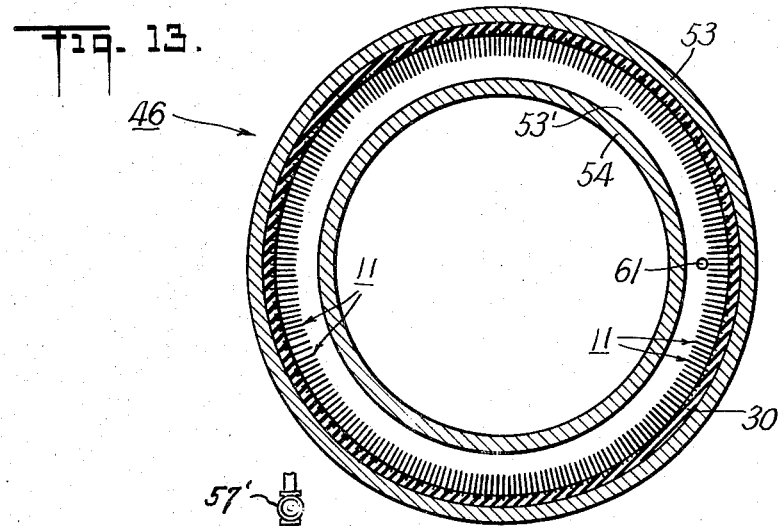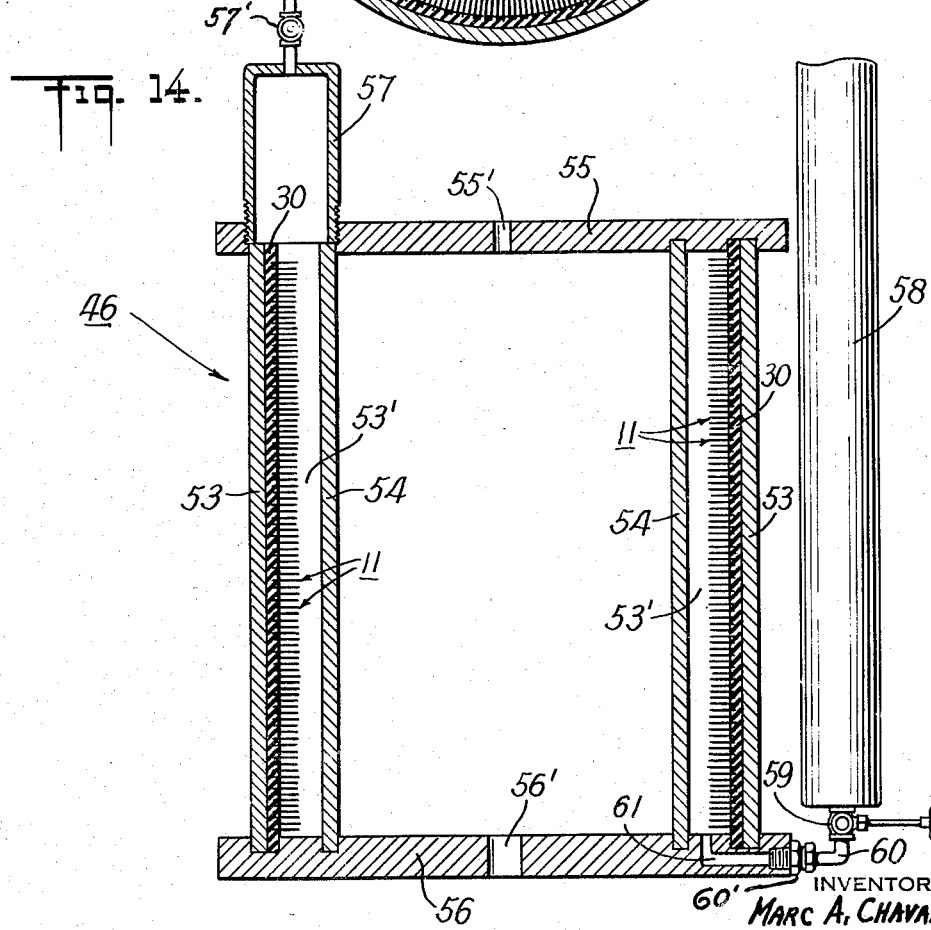

Feb. 16, 1960     M. A. CHAVANNES     2,924,863
SHEET MATERIAL PERFORATION
Filed Jan. 4, 1955     4 Sheets-Sheet 4
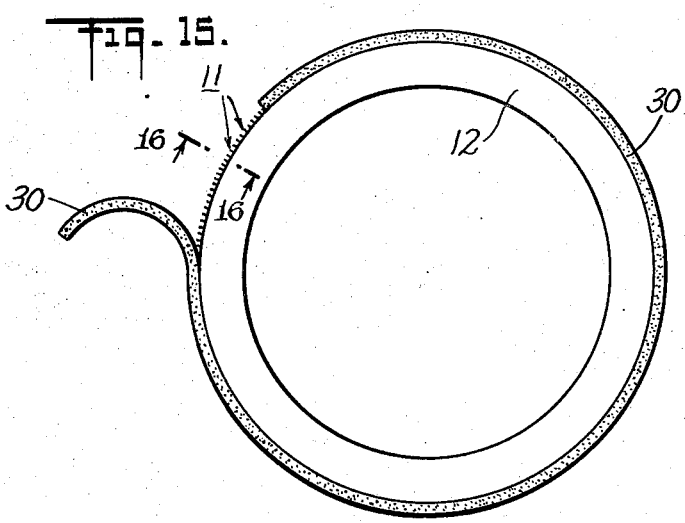
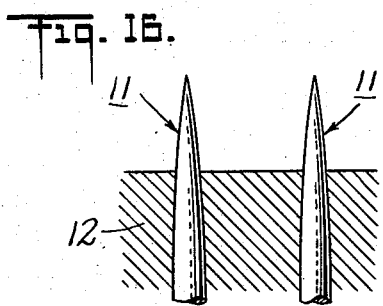
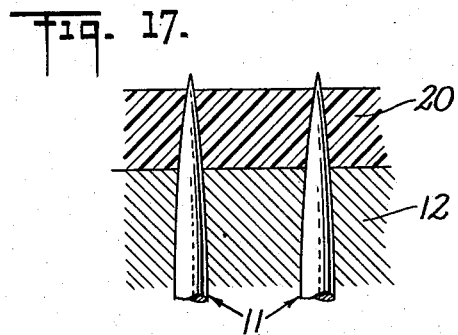
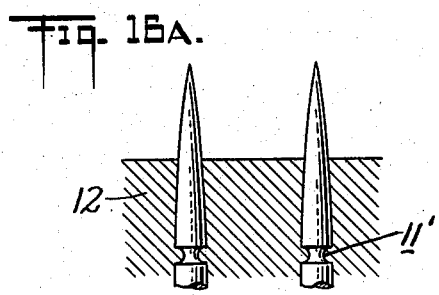
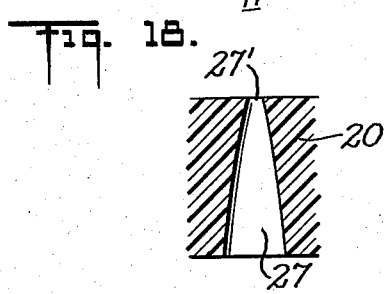
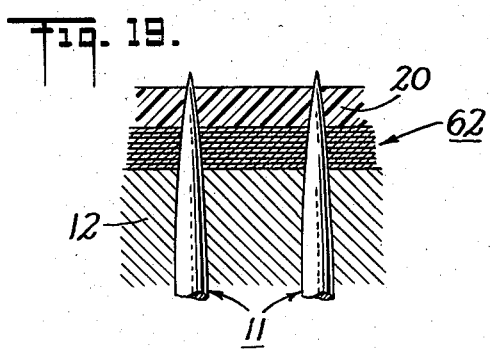
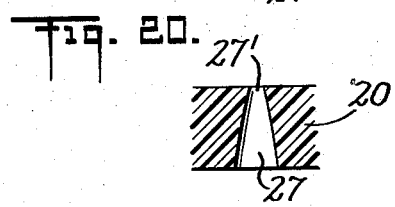
INVENTOR:
MARC A. CHAVANNES
BY Frederick Breitenfeld
ATTORNEY United States Patent Office 2,924,863
Patented Feb. 16, 1960

2,924,863

SHEET MATERIAL PERFORATION

Marc A. Chavannes, New York, N.Y., assignor of thirty percent to Morris J. Fellner, New York, N.Y.

Application January 4, 1955, Serial No. 479,717

12 Claims. (Cl. 22—203)

This invention relates generally to the perforation of sheet materials and to the resultant perforated products, and more specifically concerns an improved method and apparatus for providing a multiplicity of fine perforations in materials such as leather, cloth, plastic and the like. The invention further concerns a new and improved method and apparatus for fabricating perforating rollers of special and unique character.

With the development and production of synthetic non-porous sheet materials, such as the vinyl plastics, it has long been the desire of manufacturers to produce a film combining the wear-resistance, inertness, moisture-proofness and other desirable characteristics of such materials with an air permeability equal to or greater than that afforded by known materials such as natural leather and conventional fabrics. The attainment of air permeability in plastic films is of considerable importance in a variety of applications. For instance, when such films are used as a wall covering, porosity will not only facilitate its application but will prevent mildew formation by reason of entrapped moisture. In furniture and automobile slip-cover applications the use of perforated films allows the material to "breathe," and prevents not only condensation of moisture but also rupture of the films by the entrapment of air. Another important need existing for air permeable plastic materials is in the packaging industry for foods and similar products to permit the escape of gases that may be generated within the package and avoid the undesirable condensation of moisture. Similarly, permeability in plastic sheets that are adhesively laminated permits evaporation of the solvent through the porous sheet.

Accordingly, it is one object of the invention to provide plastic and other sheet materials having a relatively high degree of air porosity while nevertheless retaining their waterproof and other desirable characteristics, and having the same "feel" and appearance as the original unperforated material.

Another object of the invention resides in the provision of new and improved apparatus for perforating materials of the type referred to, the apparatus being specially designed and constructed to effect substantially uniform porosity (if desired) even on different thicknesses of material, and wherein the ratio of the area of the perforations to the area of the material can be carefully and accurately controlled. Moreover the perforation of the sheet materials in this way can be accomplished during the course of manufacture and thus avoid the added expense and time consumed in unwinding and rewinding operations.

A further object of the invention is a new and improved method for fabricating a special perforating means that permits the utilization of extremely fine perforating needles permanently and irremovably anchored to and uniformly distributed over the surface of a drum. For example, with this invention as many as 400 needles per square inch can be firmly embedded in the surface of a drum with a predetermined portion of each needle extending from the surface. Moreover, the length of the needles extending from the drum can be maintained within very close tolerance so that exceedingly uniform perforations may be obtained when the drum is used.

Another object of the invention resides in the provision of improved and relatively inexpensive apparatus which produces exceedingly fine perforations in plastic and other sheet materials and which is rugged, dependable and readily adaptable for use in automatic equipment.

Another object of the invention resides in the provision of improved waterproof packaging material for food and other products that will prevent the collection and condensation of moisture in the packaged article and permit the liberation of gases that may be generated by the product during storage.

Another object of the invention is the provision of new and improved perforated sheet material having permanently formed perforations therein of a shape and size that will permit gases to flow freely therethrough while impeding the transfer of liquids.

Another objective of the invention is to provide a needle-carrying drum or roller whose cylindrical surface is provided with a furry array of many closely spaced fine needles, all of them being firmly anchored and projecting in accurately radial directions, and to provide this drum in an entirely practical and economically-feasible manner. This objective is achieved in part by means of a unique procedure involving the preliminary embedding of the needles, pointed ends in, within a special needle-gripping flexible sheet of rubbery material, the needle shanks projecting from this sheet in a furry array in which the individual needles are all accurately perpendicular to the surface of the sheet.

The resultant perforating roller is of novel character, having a rigid foundation of cast metal in which the needle shanks are firmly embedded, there being at least 200 needles per square inch of drum surface and each projecting needle part being cone-shaped with a base diameter of no more than 0.04 inch and a height not exceeding 0.10 inch.

These general objectives and advantages and such other objects and advantages as may hereinafter appear or be pointed out, are achieved in the manner illustratively exemplified in the accompanying drawings, in which—

Fig. 1 is a diagrammatic view of fabric perforating apparatus in accordance with the preferred embodiment of the invention;

Fig. 2 is a cross-sectional view of a fragment of sheet material perforated with the apparatus shown in Fig. 1 and with a portion thereof enlarged to illustrate the character and arrangement of the perforations therein;

Fig. 3 is a greatly enlarged view of an individual perforating needle shown by itself;

Fig. 4 is a fragmentary view of the perforating roller showing the embedded arrangement of perforating needles therein;

Fig. 5 is a side elevation in partial section of special apparatus used in the fabrication of a perforating roller as shown in Fig. 4;

Figs. 6 and 7 are cross-sectional views of Fig. 5 taken along the lines 6—6 and 7—7 thereof;

Figs. 8 through 10 illustrate successive steps in the use of the apparatus shown in Fig. 5 for the placement of the perforating needles within a flexible needle-gripping sheet during the fabrication of a perforating roller in accordance with the invention;

Fig. 11 is a fragmentary perspective view of the flexible sheet with the needles positioned thereon;

Fig. 12 is a side elevation in partial section of casting apparatus employed in the fabrication of the perforating roller;

Fig. 13 is an enlarged cross-sectional view of Fig. 12 along the line 13—13 thereof;

Fig. 14 is a cross-sectional view of the annular perforating roller mold shown in Fig. 12;

Fig. 15 is an end view of a cast perforating roller, showing the removal of the flexible sheet after completion of the casting operation;

Fig. 16 is a greatly enlarged cross-sectional view of Fig. 15 taken along the line 16—16 thereof;

Fig. 16a is an enlarged view of a fragmentary section of Fig. 16 showing a modified needle structure;

Fig. 17 is a cross-sectional view of a fragmentary part of the perforating roller in the process of perforating a sheet material;

Fig. 18 is an enlarged cross-sectional view of an opening formed in the sheet material in accordance with the invention;

Fig. 19 illustrates the procedure for perforating sheet materials somewhat thinner than that illustrated in Figs. 17 and 18; and Fig. 20 is a cross-sectional view of an opening formed in the thinner sheet materials.

The perforation of waterproof materials such as sheet plastic, plastic coated fabrics and the like has presented a serious problem in industry since no successful methods have been developed for making these materials porous to air and other gases and at the same time maintain the waterproof qualities of the fabric. Prior attempts to solve this problem have been unsuccessful because it was not possible to provide a sufficiently large number of perforations in the material of such minute size as to limit flow through the openings to air and other gases and prevent the flow of liquids. This invention successfully achieves this result, which is attained in part by the provision of an improved method and apparatus for fabricating special perforating rollers that produce a very large number of perforations per unit area (at least 200 per square inch, and in many cases up to 400 or more per square inch). In addition the roller is so arranged and constructed that the size of the openings formed in a sheet can be modified quickly and easily within certain limits as determined by the extent of radial projection of the perforating needles and the thickness of the fabric to be treated, as will be described.

Referring now to the drawings, Fig. 1 shows one embodiment of apparatus for perforating sheet materials in accordance with the invention. In this figure the perforating roller is denoted by the numeral 10 and includes a plurality of fine needles 11 supported by a metallic ring or cylinder 12. This ring is in turn supported by a central mandrel 13 adapted to be rotated about the driven shaft 14.

The cooperating roller 15 consists of a central mandrel 16 supported by the shaft 17 and an outer layer 18 of a soft readily permeable material such as cloth or felt having a sufficiently open structure to permit the reception without strain of the needles 11 of the roller 10. The sheet 20 (which is shown in greatly exaggerated thickness for purposes of clear illustration) is continuously fed into the apparatus from a supply roll 19. As it is withdrawn from the roll 19 it passes over the top side of a ribbed so-called expanding roller 21 (well-known per se) to remove all wrinkles. The smoothed sheet then moves about the underside of a cooperating idling roller 22 and over the top of a driven roller 23 to the drum 15. The rollers 21, 22, 23 and 15 are preferably spaced one from the other a distance approximately equal to the thickness of the heaviest material 20 to be perforated. After the material has passed between the rollers 10 and 15 it passes between a pair of discharge rollers 24 and 24' and beneath a second discharge roller 25, then onto a suitable take-up spool 26.

In order to prevent the application of undue tension to the material 20 relative to the roller 10, which might result in damage to the fine needles 11, the rollers 24 and 24' are preferably driven through a slip clutch that will maintain a substantially uniform stress on the material 20 just sufficient to peel it from the perforating roller 10. In addition, it is important that the rollers 23, 10, 24 and 24' be driven at a uniform speed to avoid any possibility of relative motion between the material 20 and the roller 10. The spool 19 while mounted for free rotation may be provided with suitable braking means to maintain the desired degree of tension on the material as it engages the roller 21. Similarly the take-up spool 26 is preferably driven through a slip clutch or other suitable means so that predetermined tension is maintained on the material as it leaves the roller 25 and is wound on the spool 26.

Of primary importance is the need for subjecting the sheet material in unstretched condition to the perforating action of the needles. If the material is of a kind that has a tendency to stretch, the perforating process must be carried out prior to any subsequent embossing or other treatment which might impose tension to the sheet. On the other hand, if the material has no stretching characteristics, the perforating procedure indicated in Fig. 1 may take place, as may be desired, either before or after any other treatment to which the sheet is to be subjected.

An example of sheet material perforated by the apparatus shown in Fig. 1 is illustrated in section in Fig. 2 with a portion thereof magnified. It will be observed that a plurality of tapered openings 27 are formed through the material. These openings are of extremely small dimensions, but as will be pointed out, the dimensions of the minute end portions 27' of the openings 27 may be controlled with a high degree of accuracy in order to attain any selected degree of porosity. In this way a plastic material can be perforated, if desired, to such a degree that it will transmit air or gas and at the same time block the flow of liquid.

Merely by way of example, it may be stated that sheet material such as vinyl plastic having a thickness less than 0.05 inch has been provided with a multiplicity of openings such as those shown at 27 in which each opening has a diameter at the larger end of considerably less than 0.005 inch. In most cases, the existence of the perforations cannot be perceived by ordinary inspection or feel of the material, but manifests itself only in the effects produced by the porosity that has been achieved.

The perforating roller 10 illustrated in Fig. 1 is prepared with needles disposed about its periphery and extending accurately radially therefrom. They are spaced to provide at least 200 needles per square inch and with the improved process to be described for the fabrication of this roller as many as 400 needles and even more may be provided per square inch. An example of a needle utilized in the fabrication of the roller 10 is shown in Fig. 3 and denoted by the numeral 11. It is preferably composed of a high quality carbon steel. The shank 28 of the needle shown constitutes about three-fifths of its length though this dimension is critical only with respect to the thickness of the embedding metal collar 12 which normally has a wall thickness about twice the shank length. The point 29 of the needle is provided with a taper that imparts a substantially conical configuration. The tapered part (A in Fig. 3) is preferably not over 0.1 inch in length. The diameter of the shank part of the needle, hence at the base of the cone-shaped pointed end, is designated C in Fig. 3, and may be as small as 0.01 inch, although needles in the range between 0.01 and 0.05 inch in diameter have been successfully employed. The over-all length B of the needle may be varied to suit requirements. In the needle chosen for illustration in Fig. 3 the length is about 0.25 inch, and the tapered part 29 constitutes about two-fifths of this. In the other figures the needle shanks are shown considerably longer and have been exaggerated for clearness of illustration.

The needles 11 are embedded in the ring 12 so that the butt ends of the shanks 28 are spaced a substantial distance from the inner edge 12' of the ring. Moreover, each needle 11 is embedded in the ring 12 so that a portion of the tapered or substantially cone-shaped pointed part 29 is enclosed within the ring and thus functions to securely retain the needle in position therein. This structure is illustrated in Fig. 4, and will be alluded to again in Figs. 16 and 16a.

In the fabrication of the perforating roller 10 now to be described, it has been found that a plurality of needles can be held in position one relative to the other during the casting or molding operation by preliminarily embedding the points thereof in a sheet of heat resistant flexible resilient material adapted to exert a firm grip upon the embedded points. The needles are inserted into this resilient sheet while the latter is supported on a flat surface. After the needles have been inserted in substantially parallel relationship and extending outwardly from the sheet at an accurate perpendicularity thereto, the sheet is rolled to form a circular cylinder whereupon the needles automatically assume accurately radial positions relative to the cylinder with their points embedded in the resilient sheet and the shanks extending radially inwardly. The needle-gripping sheet may comprise any suitable heat resistant material having rubber-like characteristics, substantial gripping power, and sufficient softness to receive the points of the needles and then be shaped into the form of a cylinder. Materials that have been found to be satisfactory for this purpose and that will withstand the casting temperatures to be discussed are synthetic rubbers such as the polychloroprene commercially known today as "neoprene."

The insertion of the needles into the heat resistant flexible material is illustrated in Figs. 5 through 11 inclusive and the flexible sheet is generally denoted by the numeral 30. The sheet 30 is placed on a transportable table or carriage 31 carried by suitable slides 32 and transporting means 33 in the form of a lead screw. While not shown, the lead screw 33 is preferably provided with a suitably calibrated dial to determine the linear transportation of the carriage or table 31 with rotation of the screw 33. The needles 11 are inserted into the sheet 30 in successive rows by means of an elongated needle holder or clamp 34 illustrated in Figs. 5–7. While this needle holder may be designed to accommodate or hold any desired number of needles its length is preferably coordinated with the length of the roller to be made so that all the needles of a single longitudinal row can be inserted into the sheet 30 at one time.

The needle holder is preferably formed of two parts, these being a back plate 35 and a front or cover plate 36. The back plate 35 is of relatively heavy material and is provided with a plurality of needle receiving slots 37. These slots are slightly shallower than the diameter of the needles to be supported thereby and extend inwardly from the lower edge 35' of the plate 35. The position of the needles 11 in their slots 37 is accurately controlled by a longitudinal rib 38 located in a recess 39 in the block 35. This rib 38 extends for the entire length of the holder 34 and forms the inner termination of each of the slots 37.

The needles to be used in the fabrication of the perforating roller 10 are inserted into the slots 37 by hand or machine, with their points 29 extending outwardly as shown in Fig. 5. When all the needles of one row are in place the cover plate 36 is fastened down over the needle shanks by means of four screws 40. The rib 38 facilitates the application of the cover 36 by abutment with one wall of the recess 41 in the part 36. A gasket 42 carried by the plate 36 overlies the needles 11 and other contact points between the two members 35 and 36. The gasket 42 is of a resilient material and exerts substantially uniform pressure on the needles 11 to secure them firmly in their slots 37.

The lower edge of the plate 36 is tapered inwardly as indicated at 36' so that the distance between the lower apex of the face plate 36 and the needles 11 is slightly less than the desired distance between successive rows of needles on the finished roller 10.

After a group of needles has been loaded into the needle holder 34 the holder is placed in a suitable supporting or clamping mechanism 43 (see Fig. 8) having thumb screws 44 for clamping it in position. In Fig. 8 one row of needles 11 is shown as having been inserted into the sheet 30, and the carriage 31 is shown in the position it assumes after having been transported a distance equal to the desired spacing between successive rows of needles. With the newly-loaded needle holder in position in the clamp 43 the supporting mechanism 43 is lowered a distance sufficient to insert the tips of the clamped needles 11 into the sheet 30. It is important in this operation accurately to control the downward motion of the clamping means 43 so that a predetermined portion of the tip of the needle is pressed into the sheet 30, as it is the portion of the tip embedded in the sheet 30 that will ultimately protrude from the finished perforating roller. As the clamp 43 is moved downwardly to embed the needles into the flexible material to the desired accurately controlled extent as shown in Fig. 9 the preceding row 11 of needles will be moved to one side by reason of the tapered portion 36' of the face plate 36. At this time, the wing nuts 44 are loosened and the clamp is removed leaving the needle holder in the position shown in Fig. 9. Then the screws 40 are removed, whereupon the elements 35 and 36 of the needle holder can be separated and removed as shown in Fig. 10 to leave the second row of needles 11 deposited in the resilient needle-gripping material 30. It will be observed (Fig. 10) that upon removal of the face plate 36 the previous row of needles moves back into parallel alignment with the newly inserted row of needles.

This process is repeated until the entire surface of the sheet 30 is covered with a furry array of needles as shown in Fig. 11. The needles are now ready for the casting procedure.

The casting or molding apparatus is generally shown in Fig. 12 and includes an outer container 45 of suitable size and shape for receiving and holding the mold 46. With the container 45 there is a perforated shelf 47 for holding the mold at a point spaced from the bottom of the container, and an electric heating element 48 is positioned beneath this shelf. The entire container is filled with a liquid 49 in any suitable manner as for instance by means of an auxiliary tank 50 interconnected with the container 45 by means of a pipe 51 and a control valve 52.

The mold 46 is heated prior to the molding operation and this is accomplished by heating the fluid 49. The temperature of the mold should be brought up to and preferably slightly beyond the melting point of the metal forming the ring 12 in which the needles are to be embedded. For this reason the physical characteristics of the liquid 49, and the casting metal, must be coordinated.

While any suitable low melting point casting metal is generally satisfactory, it is important that it be not brittle and that it have a temperature coefficient of expansion as close as possible to a value of zero. One alloy that has been found suitable for this purpose comprises a mixture of bismuth and tin with a melting point of approximately 330 degrees Fahrenheit. An alloy with a melting point in the range of 300° to 350° has been found to be desirable as these temperatures will not adversely affect the temper of the carbon steel needles 11 during the casting operation. Moreover, having a melting point in this range a metal will not affect the needle-gripping sheet 30, where the latter is composed of "neoprene" or equivalent synthetic rubbers.

Inasmuch as the preferred metal for forming the ring 12 melts at approximately 330° Fahrenheit it is important that the fluid 49 be of such a nature that it can be heated to temperatures equal to or exceeding 330° Fahrenheit without boiling or liberating gases during the preheating operation. Fluids such as a silicones, heavy petroleum, or a fluid known commercially as "Dowtherm," have been found to be satisfactory. While any suitable liquid may be employed it is essential (for reasons presently to be pointed out) that it be a stable one that will not attack the heat resistant rubbery material 30 or the needles and in addition will have a specific gravity less than that of the metal at the melting point of the metal.

The mold 46 is shown in section in Figs. 13 and 14 and includes an outer cylindrical wall 53, an inner cylindrical wall 54 and upper and lower face plates 55 and 56 for holding the cylindrical walls in concentric alignment one with the other. For convenience the upper and lower plates 55 and 56 are provided with suitable grooves for securing and holding the inner and outer cylindrical members 53 and 54. The annular space 53' between these cylindrical members is the mold cavity and its width is determined by the thickness of the resilient material 30 and the desired thickness of the metallic cylinder 12 in which the needles 11 are to be secured. The upper and lower plates 55 and 56 are provided with one or more openings 55' and 56', respectively, for the admission of fluid 49 during the preheating operation.

The upper plate 55 is provided with a special air vent chamber 57 communicating with the annular space 53', and a valve 57' is provided in the vent 57 to limit the discharge of fluid from the cavity 53'. The valve 57' is preferably spaced from the mold 46 so that it is above the level of the fluid 49 when the mold is positioned within the container 45.

Adjacent the mold 46 is a vertically disposed filler tube 58. The lower end of this tube 58 is coupled with the cavity 53' by means of a three-way valve 59, piping 60, a union 60' and a passage 61 in the base plate 56. The three-way valve communicates not only with the filling tube 58 and the feed pipe 60, but also with a supply of heating liquid 49. The latter connection has not been shown. In order to control the flow of fluid 49 and the liquid metal into the mold it is preferable that the operating handle 59' of the valve 59 be arranged to extend through the wall of the container 45 as illustrated in Fig. 12. In this case it will of course be necessary to provide a suitable liquid seal between the shaft of the operating handle 59' and the wall of the container 45 or provide a flexible shaft or other means for operating the valve from a point above the level of the liquid 49.

After the needles 11 have been inserted into the flexible resilient sheet 30, the latter is formed into the shape of a cylinder with the shanks of the needles 11 extending inwardly. The top plate 55 of the mold 46 is removed and the flexible sheet together with the needles is inserted into the opening 53' as illustrated in Fig. 14. It will be observed that the inner ends of the shanks of the needles 11 are spaced from the wall 54 a distance approximately equal to the length of each needle shank. While the resilient quality of the material 30 will cause it to lie flat against the inner surface of the cylindrical wall 53 it is preferably engaged by a cooperating groove within the upper and lower walls 55, 56 to insure its retention in this cylindrical configuration.

After the sheet 30 has been positioned and the top plate 55 applied, the entire unit is placed into the container 45 and completely immersed in the liquid 49. The liquid is then brought up to a desired temperature of 350 to 360 degrees. Then the valve 59 is carefully adjusted to admit a quantity of the same heating fluid very slowly into the cavity 53' itself. During this procedure the valve 57' is open.

While the mold is being heated, both inside the molding cavity and outside it, metal in either the liquid or the solid state is placed into the filling tube 58 and permitted to remain there until it is completely molten. When the mold has been thoroughly preheated and the metal in the filling tube 58 brought up to the desired temperature the valve 59 is operated to prevent further admission of preheating liquid and to admit the molten metal. The metal slowly displaces the liquid since the latter has a specific gravity slightly lower than that of the molten metal. As the mold cavity is very gradually occupied by the metal the needles 11 will remain substantially undisturbed and in their true radial positions. Moreover, the absence of air will prevent the creation of defects or imperfections in the metal and the metal will completely close in about the needles even though they are spaced very closely together.

After sufficient molten metal has been introduced to completely fill the cavity 53', and the metal appears in the vent cap 57, the valve 59 is closed. At this point the drain cock 46' is opened to drain the heated liquid 49 from the spaces surrounding the mold, and cool liquid from the tank 50 is admitted through pipe 51 and valve 52 to chill the mold as rapidly as possible. As soon as the metal within the chamber 53' has solidified the top plate 55 is removed from the mold along with the outer cylindrical member 53. The filler tube 58 is disconnected at the union 60' and the cast metal ring 12 is then severed from the metal remaining in the passage 61 by lightly tapping the plate 56 downwardly. This can be accomplished successfully because the metal is relatively soft. After the ring 12 with the needles embedded therein has been removed from the mold the sheet 30 may be peeled from the periphery as shown in Fig. 15 whereupon the cylinder 12 is ready to be mounted on a suitable mandrel 13 as described in connection with Fig. 1. The inner cylinder 54 is preferably removed just prior to insertion of the mandrel though in certain cases it may be desirable to utilize it as part of the mandrel.

While, as hereinbefore described, the molten metal may be introduced into the mold cavity under atmospheric pressure it may be desirable in certain cases to introduce the metal under a predetermined pressure exceeding that of the atmosphere. In this case the valve 57' controlling the vent 57 would be closed or almost closed and suitable piston-operated or other pressure means may be employed in connection with the filler tube 58 to force the metal into the bottom of the cavity 53'. The injection pressure and rate of introduction of the metal into the cavity 53' can be controlled by the operation of the pressure producing apparatus and the size of the orifice or vent produced by the valve 57'.

It will be understood, also, that the use of a three-way valve at the point 59 is not essential, since it may be feasible under certain circumstances to introduce both the heating liquid 49 and subsequently the molten casting metal, through the same filling tube 58.

Among the important and highly advantageous steps of the process are the preliminary embedding of the needle points in the flexible gripping sheet to an accurately controlled degree of penetration and in accurately perpendicular relation thereto, whereby the needle shanks automatically position themselves in accurately radial directions within the cylindrical mold cavity; and in the step or steps of introducing the preheating liquid, and later the casting metal itself, at a slow rate so controlled that dislocation of the needles from their accurate radial dispositions is avoided.

While perforating rollers of the character described may be fabricated in any desired length it is preferable to make them in relatively short sections of 6 to 10 inches long and then mount a series of these sections on a single mandrel to provide an elongated roller. In this case the ends of the casting are planed to provide smooth meeting surfaces between each pair of adjacent sections. Forming the roller in small sections is desirable because in the event of damage to one section of the roller that section can easily be replaced without necessitating the fabrication of an entirely new roller.

An enlarged view of the completed structure is shown in fragmentary form in Fig. 16. In this figure it will be observed that a portion of the tapered end of each needle 11 lies below the surface of the cast metal ring 12. In this way the needles are firmly locked in place and cannot come loose or fall out during use, as might be the case if they were merely set rearwardly into drilled or otherwise preformed holes (assuming that such a procedure were feasible at all, considering the minute sizes and the needle density involved).

Figure 16a is an enlarged view similar to Fig. 16 to illustrate another method of locking the needles 11 in place. In this case a circular groove 11' is formed in the shank of each needle and becomes filled with the casting metal during the fabrication process. The innermost edge of the groove constitutes an outwardly directed shoulder that fulfills the same purpose as the outwardly directed convergence of Fig. 16, to lock the needle against outward displacement. It is of course apparent that any outwardly directed shoulder or other deformation on the needle may be employed to lock the needles in place.

In the perforation of plastic, leather and other materials the size of the openings or perforations 27 formed therein can be controlled by the degree of penetration of the needles 11. The projecting part of each needle has a length of about 0.1 inch and it is substantially cone-shaped as hereinbefore described. A roller having a furry array of needles of this kind is adequate for most commercial purposes since most materials to be perforated do not exceed 0.1 inch in thickness. In Fig. 17 a material somewhat less than 0.1 inch in thickness is illustrated as being perforated by the needles 11 to form a plurality of openings 27 (Fig. 18). In the event substantially thinner fabrics are to be perforated with exceedingly fine perforations it may be desirable to limit the degree of perforation in order to control the hole size. To vary the degree of penetration of the needles and thus control the size of the opening formed in the sheet the perforating roller may be covered by a plurality of layers of a suitable foil such as aluminum foil generally denoted by the numeral 62 (Fig. 19). It will be observed that these layers of aluminum cover the base of the needle tips and thus limit the degree of penetration. By applying a suitable number of layers of aluminum foil the size of the opening formed in a relatively thin sheet can be made exactly the same size as the openings or perforations formed in the heavier sheet as shown in Fig. 17. The perforation of the thinner material 20 of Fig. 19 is shown in Fig. 20 and it will be observed that the narrow section 27' of the opening in the thinner sheet of Fig. 20 can be made identical in size to the narrow section 27' of the opening 27 of the thicker sheet shown in Fig. 18.

While the thickness of the foil used to control the size of the perforations is not critical it has been found that aluminum foil of the order of .001 inch in thickness has produced excellent results.

While the invention is obviously useful for the perforation of plastics, leather and many other sheet materials, whatever their nature may be, it is important in each case to consider the characteristics of the material and the purpose for which it is to be perforated in order to attain the desired results. Many plastic materials do not include plasticizers therefore will not stretch to any great extent. In this case the degree of tension paced on the material during the perforating process is not critical though it is of course desirable that the sheet be maintained in a relatively relaxed, unstretched condition. In the case of plastics having plasticizing agents in them the ultimate use of the material may involve some stretching. In this event the size of the opening in the finally stretched condition of the plastic will control the size of the opening that is to be produced while the plastic is in the relaxed or unstretched condition. While plasticized sheets will tend to close the openings formed by the perforating process in accordance with this invention the openings are nevertheless permanently formed therein and will appear quite clearly when the material is stretched.

It has been found that while sheet materials perforated in accordance with this invention have a wide variety of applications, they are particularly useful in providing wrappings for food products such as meat and the like. In the case of meats, for example, it has been found that gases are liberated which must be dissipated if the meat is to stay in good condition. The use of air-tight coatings causes relatively rapid deterioration of the meats since these gases cannot escape and air is not admitted into the container to prevent condensation of moisture. Through the utilization of perforated plastic material in accordance with this invention the minute orifices formed in the plastic will permit the free flow of gases into and out of a package and at the same time provide a substantially water tight enclosure for the food product. The same effective results have been experienced with other types of packing devices such as paper bags, with or without a plastic coating, in which food is intended to be stored for substantial lengths of time. In packaging materials excellent results have been obtained in sheets as small as .001 inch in thickness.

Another industrial use for perforated sheet material of the character produced by this invention is in paper bags intended to contain granular material. During the filling of such bags, the perforations facilitate the escape of air, yet the bag is effectively intact so far as holding the granular content is concerned.

The invention is also useful for increasing the porosity of leather and similar materials, such as plastic-coated fabrics, without modifying their texture or appearance.

Because of the extreme fineness of the perforations, the material being perforated may readily be subjected to two or more perforating processes, if desired, to further increase the porosity. This can be done without necessarily coordinating the several perforating steps since the chance of absolute registration of one set of perforations with another is so small that it can be neglected.

While only one embodiment of the invention has been shown and described it is apparent that many changes, modifications and alterations may be made without necessarily departing from the true scope and spirit thereof, as expressed in the appended claims.

Having thus described my invention what I claim as new and desire to secure by Letters Patent is:

1. The method of making a perforating roller comprising the steps of embedding the tip portion of each of a plurality of fine pointed needles in a flexible sheet of resilient heat resistant material with the needles in closely spaced relationship to effect compression of the portions of the sheet material between the needles when the material is curved in a direction wherein the free ends of the needles are directed toward the center of the radius of curvature and thereby cause said portions to assume convex configurations and exert a firm grip upon said embedded needle tips, placing said sheet in a cylindrical mold with the bodies of the needles converging radially inwards to compress the material between the needles and exert a firm grip thereon, slowly filling said mold with molten metal having a melting point below the melting point of said needles and sheet, cooling said metal to produces a relatively hard cylindrical member with the needles embedded therein, and then peeling said sheet from said portions of the needle tips whereby only a portion of each tapered needle tip will be exposed to penetrate the material to be perforated by said roller.

2. The method according to claim 1 wherein said mold and said heat resistant material and needles are heated prior to the admission of said molten metal.

3. The method of making a perforating roller comprising the steps of embedding the tip portion of each of a plurality of fine pointed needles in and throughout the area of a resilient rubber-like sheet with the needles in closely spaced relationship to effect compression of the portions of the sheet material between the needles when the sheet material is curved in a direction wherein the free ends of the needles are directed toward the center of the radius of curvature, forming said sheet into a cylindrical configuration with the shanks of the needles extending convergently inward thereby further compressing the material between the needles and cause said portions of the material to assume convex configurations and exert a firm grip on said embedded tip portions, depositing non-resilient needle gripping material about the needle shanks and unembedded portions of the tapered needle tips to embed and securely hold the needles one relative to the other, and then removing said sheet to expose the first said portions of the tips of said needles whereby only a portion of each tapered needle tip will be exposed to penetrate the material to be perforated by said roller.

4. The method of making a perforating roller comprising the steps of embedding the tip portion of each of a plurality of fine pointed needles in a flat flexible resilient sheet with the needles in closely spaced relationship to effect compression of the portions of the sheet material between the needles, forming said sheet into a cylindrical configuration and placing it in a cylindrical mold with the shanks of the needles extending radially inward, said curvature of the resilient sheet effecting further compression of the material between the needles and cause said portions of the material to assume convex configurations and exert a firm grip on said embedded needle tips, filling the mold with heated fluid, slowly displacing the fluid in the mold with a molten metal to completely embed the shanks of the needles and the unembedded portions of the needle tips, cooling the molten metal, removing it from the mold, and then peeling off the sheet to expose the first said portions of the tips of said needles whereby only a portion of each tapered needle tip will be exposed to penetrate the material to be perforated by said roller.

5. The method according to claim 4 wherein said metal is molded in the form of a hollow cylinder having a wall thickness approximately twice the length of the needle shanks.

6. The method according to claim 4 wherein said fluid is heated to a temperature above the melting point of said metal.

7. The method of making a perforating roller comprising the steps of holding a plurality of fine pointed needles in a fine comb-like array with the pointed tapered ends projecting outwardly, inserting the tip portion of the pointed ends of said array of needles into a sheet of flexible resilient material having gripping power, repeating the process by the insertion of successive arrays of needles into said sheet until a predetermined area of said sheet is filled with needles each standing in substantially perpendicular relation to said sheet and in closely spaced relationship to effect compression of the portions of the sheet between the needles, forming said sheet into a cylindrical configuration with the shanks of said needles extending inwardly thereby further compressing the portions of the sheet material between the needles and causing said sheet material portions to assume convex configurations; firmly gripping said needles, and then embedding the shanks of the needles and unembedded portions of the tips thereof in a metallic material whereby only a portion of each tapered needle tip will be exposed to penetrate the material to be perforated by said roller.

8. The method according to claim 7 including the steps of inserting said cylindrical sheet in an annular mold, filling said mold with a stable heated liquid, then displacing said liquid with molten metal, cooling said metal, removing the cooled metal and said sheet from the mold, and then peeling off said sheet to expose the plurality of needle tips.

9. The method according to claim 8 wherein said molten metal has a specific gravity greater than said liquid and is introduced into the bottom side of said mold.

10. The method of making a perforating roller comprising the steps of supporting a plurality of fine pointed needles in radial configuration with the tip portion of each needle point embedded in a resilient material and the shanks extending inwardly thereof, said needles being in very closely spaced relationship effecting compression of the material portions between the tips and cause the compressed material portions to bulge outwardly to form convex configurations and exert a firm grip on said needles, inserting said needles in an annular mold cavity having inner and outer cylindrical walls spaced apart a distance exceeding the length of said needles, filling the mold with a liquid, displacing the liquid in said mold with a low melting point molten metal, removing the metal with the needles and portions of the tapered tips embedded therein from the mold, and then stripping off said resilient material to expose the first said portions of the tapered tips whereby only a portion of each tapered needle tip will be exposed to penetrate the material to be perforated by said roller.

11. The method according to claim 10 wherein said inner wall remains in position within said cast metal cylinder.

12. The method according to claim 10 wherein said inner wall of said mold is removed from said cast metal cylinder and replaced by a central mandrel.

References Cited in the file of this patent

UNITED STATES PATENTS

| | | |
|---|---|---|
| 346,580 | Cobb | Aug. 3, 1886 |
| 1,955,083 | Muller | Apr. 17, 1934 |
| 2,265,243 | McCullough et al. | Dec. 9, 1941 |
| 2,294,966 | Dreyfus | Sept. 8, 1942 |
| 2,502,373 | Galloway | Mar. 28, 1950 |
| 2,504,080 | Myers | Apr. 11, 1950 |
| 2,604,362 | Sugerman et al. | July 22, 1952 |
| 2,667,925 | Dalphone | Feb. 2, 1954 |
| 2,699,208 | Schur | Jan. 11, 1955 |

FOREIGN PATENTS

| | | |
|---|---|---|
| 496,023 | Great Britain | Nov. 23, 1938 |